US011361055B1

(12) United States Patent
Levacher et al.

(10) Patent No.: US 11,361,055 B1
(45) Date of Patent: Jun. 14, 2022

(54) PROTECTION OF A CONTENT REPOSITORY USING DYNAMIC WATERMARKING

(71) Applicant: INTERNATIONAL BUSINESS MACHINES CORPORATION, Armonk, NY (US)

(72) Inventors: Killian Levacher, Dundrum (IE); Beat Buesser, Ashtown (IE); Marco Simioni, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/111,559

(22) Filed: Dec. 4, 2020

(51) Int. Cl.
*G06F 21/16* (2013.01)

(52) U.S. Cl.
CPC ...... *G06F 21/16* (2013.01); *G06F 2221/0737* (2013.01)

(58) Field of Classification Search
CPC .. G06F 21/16; G06F 21/30; G06F 2221/0737; H04N 21/8358; H04N 1/32144; H04N 1/3232; H04N 1/32288
See application file for complete search history.

(56) References Cited

U.S. PATENT DOCUMENTS

| | | | | |
|---|---|---|---|---|
| 6,801,999 B1* | 10/2004 | Venkatesan | ............. | G06F 21/10 380/28 |
| 6,898,706 B1* | 5/2005 | Venkatesan | ............. | G06F 21/10 348/E7.071 |
| 7,222,232 B2* | 5/2007 | Venkatesan | ............. | G06F 21/10 348/E7.071 |
| 7,562,228 B2* | 7/2009 | Kirovski | ............... | G10L 19/018 713/186 |
| 7,570,782 B2* | 8/2009 | Seroussi | ............... | G06T 1/0035 382/100 |
| 8,892,893 B2 | 11/2014 | Horne et al. | | |
| 9,959,586 B1* | 5/2018 | Yu | ........................ | G06T 1/0085 |
| 9,959,906 B2* | 5/2018 | Tran | ........................ | G06T 1/005 |

(Continued)

FOREIGN PATENT DOCUMENTS

| | | |
|---|---|---|
| CN | 103347019 A | 10/2013 |
| CN | 109801205 A | 5/2019 |

(Continued)

OTHER PUBLICATIONS

Mell, Peter et al. "The NIST Definition of Cloud Computing" NIST National Institute of Standards and Technology, U.S. Department of Commerce, Special Publication 800-145; dated Sep. 2011, 7 pgs.

*Primary Examiner* — Hosuk Song
(74) *Attorney, Agent, or Firm* — Cantor Colburn LLP; Kurt Goudy (57) ABSTRACT

Methods, systems and computer program products for protection of content repositories using dynamic watermarking are provided. Aspects include receiving a request for a code stored in a content repository from a user and identifying a plurality of candidate locations in the code to insert watermarks. Aspects also include generating one or more watermarks and inserting the one or more watermarks in a subset of the plurality of candidate locations in the code. Aspects further include providing the code, including the one or more watermarks, to the user.

18 Claims, 7 Drawing Sheets

(56) References Cited

U.S. PATENT DOCUMENTS

| | | |
|---|---|---|
| 10,255,414 B2 | 4/2019 | Horning et al. |
| 10,628,581 B2 * | 4/2020 | Prayaga ................. G06T 1/0021 |
| 10,949,509 B2 * | 3/2021 | Perez Freire ........... G06F 16/93 |
| 11,159,540 B2 * | 10/2021 | Abbaszadeh ......... H04L 63/145 |
| 2010/0095376 A1 | 4/2010 | Rodriguez et al. |
| 2011/0214188 A1 | 9/2011 | Collberg et al. |
| 2013/0191644 A1 | 7/2013 | Horne et al. |
| 2015/0278491 A1 | 10/2015 | Horning et al. |
| 2017/0300670 A1 | 10/2017 | Horne et al. |

FOREIGN PATENT DOCUMENTS

| | | |
|---|---|---|
| WO | 2005122114 A1 | 12/2005 |
| WO | 2020125107 A1 | 9/2019 |

\* cited by examiner

PROTECTION OF A CONTENT REPOSITORY USING DYNAMIC WATERMARKING

BACKGROUND

The invention relates generally to the protection of content repositories and, more specifically, to the protection of content repositories using dynamic watermarking.

Large and complex software project require a large number of software developers to collaborate on the development of software. In order to facilitate this collaboration, collaborative software development systems have been developed that shares significant parts of software projects often among multiple software developers at the same time. These collaborative development systems allow the software developers to work in parallel and recombine their works at any time. One drawback of collaborative development systems is that a significant number of developers have access to a software project and potentially pose a risk to leak or lose the software.

SUMMARY

According to an embodiment, a system for protection of content repositories using dynamic watermarking is provided. The system includes a memory having computer readable computer instructions, and a processor for executing the computer readable instructions. The computer readable instructions include instructions for receiving a request for a code stored in a content repository from a user and identifying a plurality of candidate locations in the code to insert watermarks. The computer readable instructions also include instructions for generating one or more watermarks and inserting the one or more watermarks in a subset of the plurality of candidate locations in the code. The computer readable instructions further include instructions for providing the code, including the one or more watermarks, to the user.

According to another embodiment, a method for protection of content repositories using dynamic watermarking is provided. The method includes receiving a request for a code stored in a content repository from a user and identifying a plurality of candidate locations in the code to insert watermarks. The method also includes generating one or more watermarks and inserting the one or more watermarks in a subset of the plurality of candidate locations in the code. The method further includes providing the code, including the one or more watermarks, to the user.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes includes receiving a request for a code stored in a content repository from a user and identifying a plurality of candidate locations in the code to insert watermarks. The method also includes generating one or more watermarks and inserting the one or more watermarks in a subset of the plurality of candidate locations in the code. The method further includes providing the code, including the one or more watermarks, to the user.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
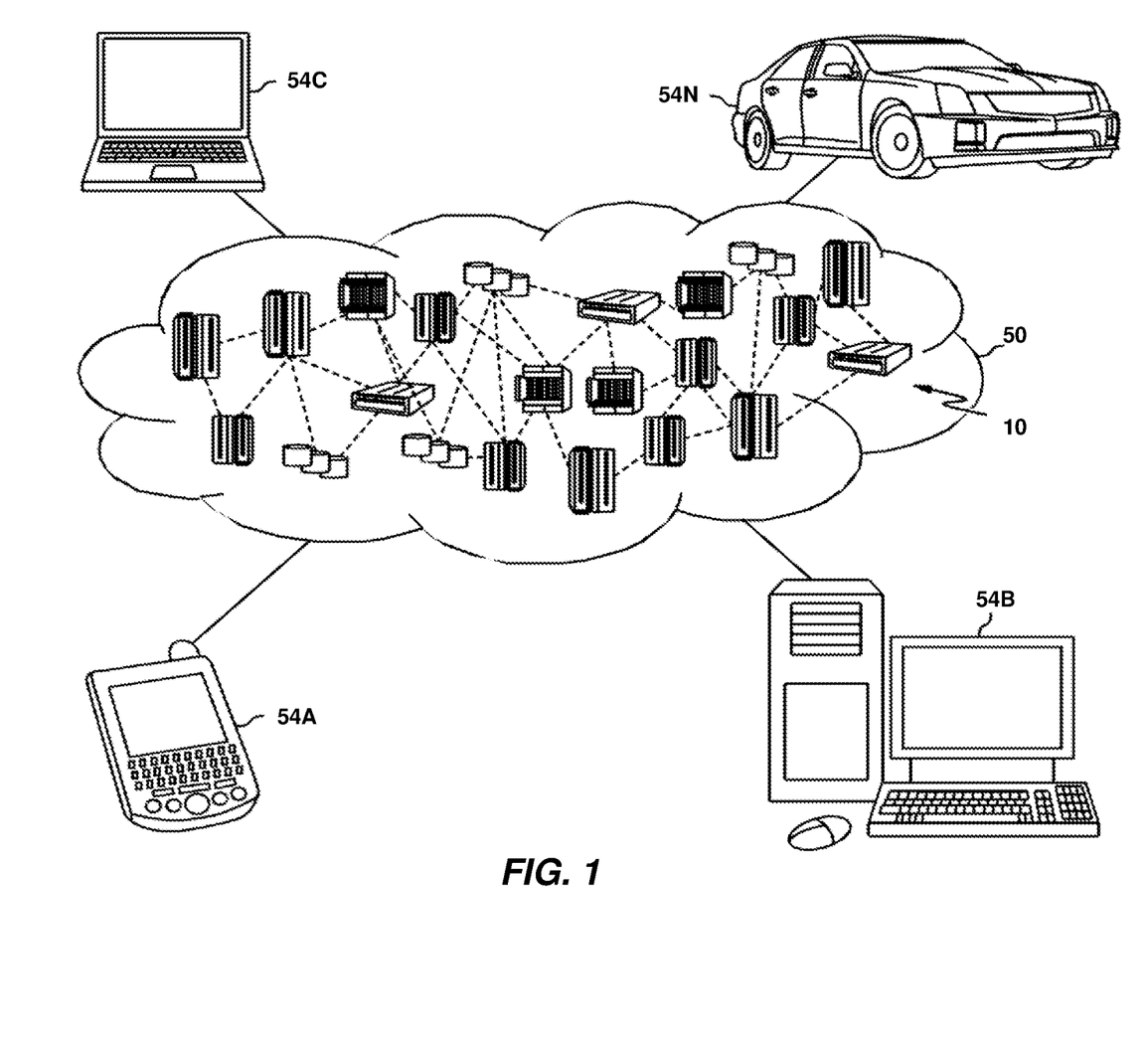
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
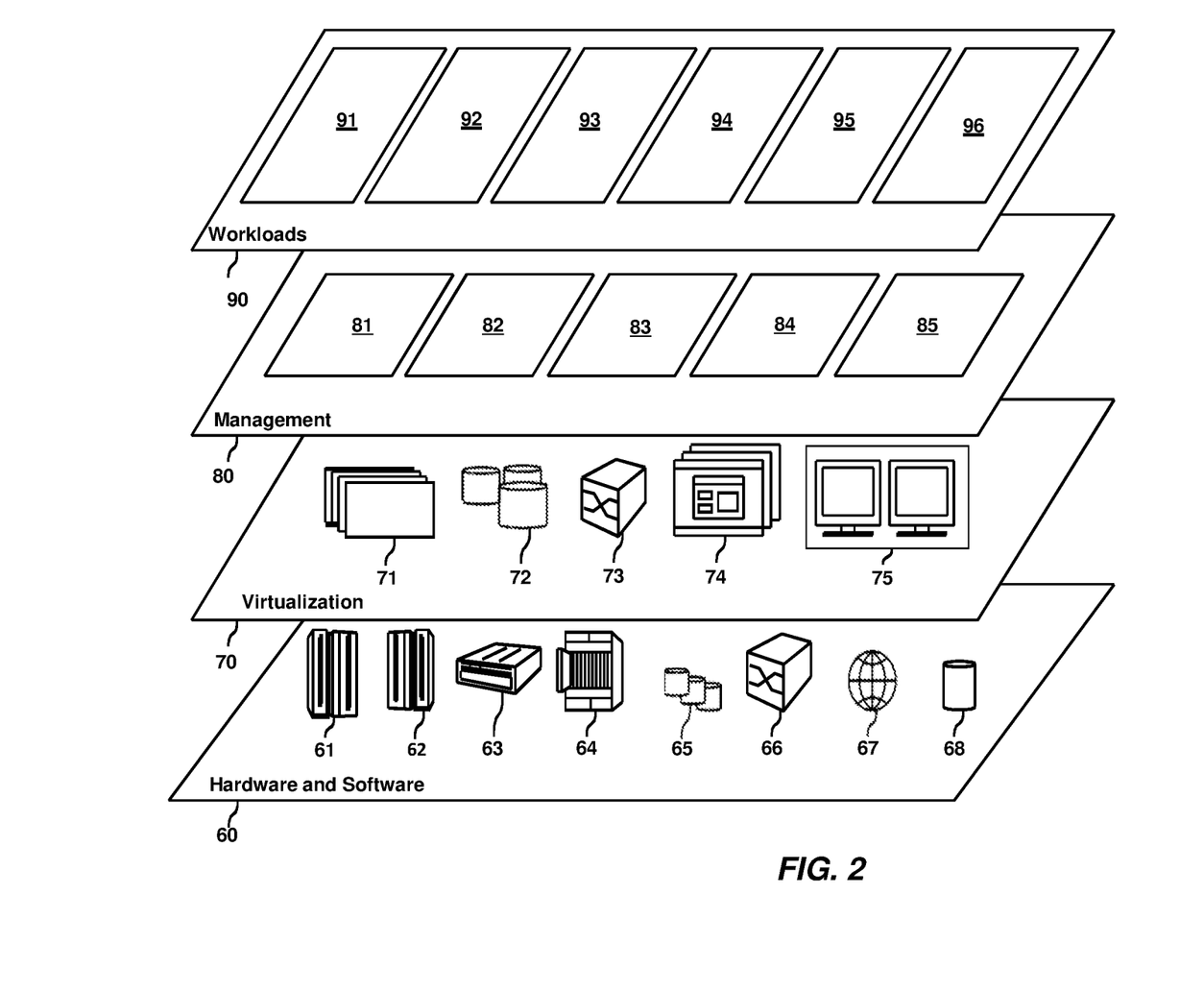
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic watermarking 96.

Figure 3:
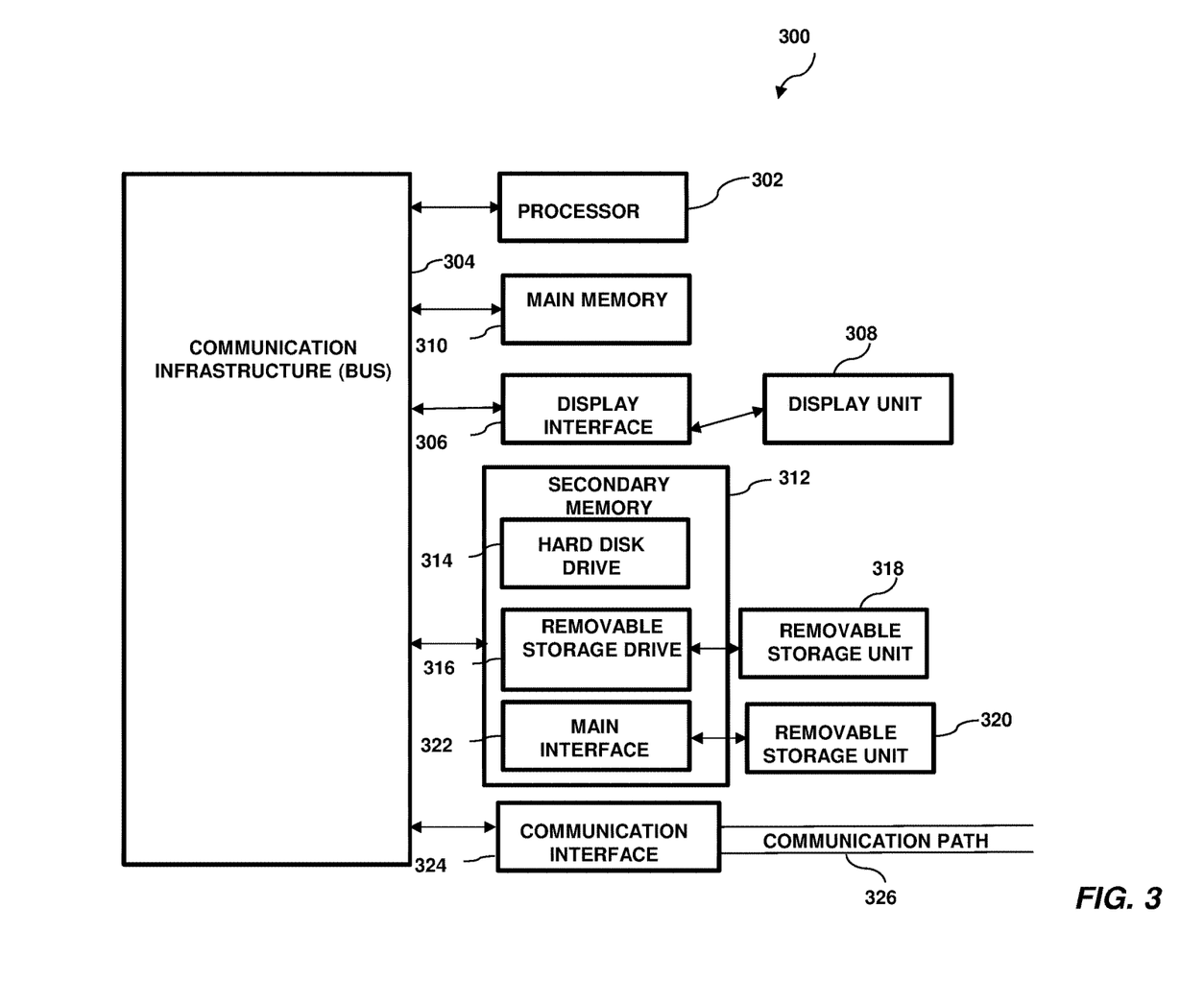
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Turning now to specific aspects of the invention, methods, systems, and computer program products for dynamic watermarking code in a collaborative software system are provided. In exemplary embodiments, user-specific watermarks are dynamically added to a source code repository without changing the functionality of the source code itself. In exemplary embodiments, the collaborative software system includes a content repository that is configured to perform dynamic watermarking by inserting user-specific watermarks into a codebase repository. The collaborative software system is also configured to track and reconcile user-specific watermark insertions within the code repository. The collaborative software system is further configured to identify the source of potentially leaked source code. In exemplary embodiments, in order to prevent groups of developers from trying to identify the watermarks by comparing their version of the source code, the watermarks are added in a manner to identify combinations of software developers in an access group.

As referred to herein, watermarking refers to making minor changes in the original codebase that do not affect the functioning or the performances of the code. In other words, the watermarks should be non-code breaking, which also includes maintaining consistency with any linter used within the codebase (e.g.: P8P etc.). In exemplary embodiments, watermarks are consistent across a given commit history graph within a given code repository. In other words, a given watermark inserted from commit 1, if unaffected by a user, should flow through all future commits. As will be appreciated by those of ordinary skill in the art, various watermarking techniques may be used, and the invention is not intended to be limited to any specific watermark generation technique. The watermark generation techniques may include, but are not limited to, adding blank lines to code, adding or removing spaces between brackets, replacing variable names with others, replacing while loops with for loops, and the like. In exemplary embodiments, the watermarks are transparent with respect to the normal non-watermarked workflow a user would perform with a codebase (i.e.: git pulls/commit/push should not be affected from a user's perspective). As used herein the term user refers in general anybody who writes/reviews/validates files stored on the code repository, such as developers.

In exemplary embodiments, a unique combination of watermarks is created and assigned to each user based on the identity of the user. In some embodiments, a unique combination of watermarks may be created and assigned to a group of users. The identity of the user can be determined based on a user identification or on a specific combination of attributes that correspond to a single user. In one embodiment, the attributes that are used to determine an identification of a user are set by an administrator or owner of the code repository. The attributes may include but are not limited to, a username provided by a user, an internet protocol (IP) address of a machine used by the user, a version identification of software used by the user, and the like. In one embodiment, a time at which a specific checkout occurred could also be considered as such attribute. In various embodiments, users may, or may not, be made aware of the fact that watermarks are being used in the code base, i.e., the existence of the watermarks does not need to be hidden from users. In exemplary embodiments, the unique signature representing the specific combination of watermarks inserted allows for a degree of removal tolerance (configurable by the code repository administrator/owner) to account for cases when users will indivertibly remove such watermarks. In these cases, the remaining watermarks are sufficient to identify this unique watermark signature.

Figure 4:
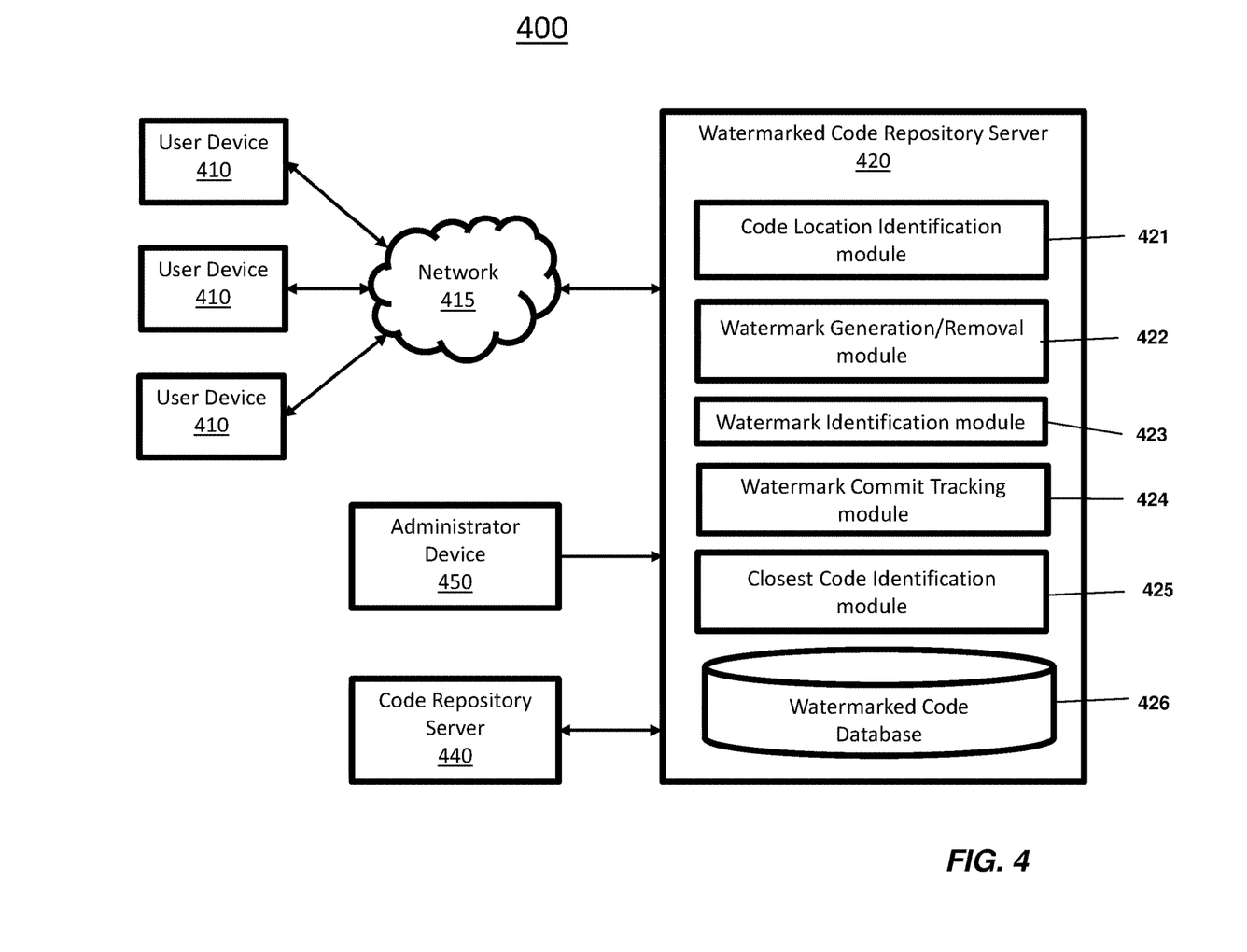
FIG. 4 depicts a schematic of a collaborative software system for the protection of a content repository using dynamic watermarking according to one or more embodiments of the present invention.

Turning now to FIG. 4, a collaborative software system 400 for protection of a content repository using dynamic watermarking according to one or more embodiments of the present invention is shown. As illustrated the collaborative software system 400 includes a plurality of user devices 410 that are configured to access a watermarked code repository server 420 via a network 415. The watermarked code repository server 420 is further configured to communicate with an administrator device 450 and with a code repository server 440, either directly (as shown) or via network 415. The network 415 may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, the user devices 410 and the administrator device 450 may be embodied in a computing system, such as the one shown in FIG. 3. In other embodiments, one or more of the user devices 410 and the administrator device 450 may be embodied in a smartphone, tablet, or any other suitable computing device. The watermarked code repository server 420 and the code repository server 440 may be embodied in a computing system, such as the one shown in FIG. 3 or in a cloud computing system, such as the ones shown in FIGS. 1 and 2.

In exemplary embodiments, the watermarked code repository server 420 is a user-facing code repository server that mimics the typical behavior of a convention code repository. The watermarked code repository server 420 includes a code location identification module 421 that is configured to statistically analyze candidate locations in the code for the potential insertion of watermarks. In one example, a code location identification module can identify candidate locations based on how often a piece of code has been modified in the past. In other examples, the code location identification module is configured to identify candidate locations based on other metrics, such as, for example, how often a user historically modifies a portion of the code.

The watermarked code repository server 420 also includes a watermark generation/removal module 422 that is configured to insert user-specific watermarks within a code base and to remove a set of watermarks from a codebase. The watermarked code repository server 420 further includes a watermark identification module 423 that is configured to identify watermarks within a given code and identify the user associated with identified watermarks based on receiving the given code and a list of watermarks previously inserted into the given code. The watermarked code repository server 420 also includes a watermark commit tracking module 424 that is configured to track the changes to a set of watermarks through a series of code commits. The watermarked code repository server 420 further includes a closest code identification module 425 that is configured to identify which commit is the closest to a provided code based on a stored commit history. The watermarked code repository server 420 also includes a watermark code database 426 that is configured to store a record of what watermarks were inserted in the code for what users.

In exemplary embodiments, the administrator device 450 of collaborative software system 400 is configured to provide a code leakage sensitivity parameter and watermark configurations for the watermarked code repository server 420. In one embodiment, the code leakage sensitivity parameter and watermark configurations are set by an owner or administrator of the watermarked code repository server 420. The code leakage sensitivity parameter is a variable to controls the level of security that the watermarked code repository server 420 uses to protect the codebase. The code leakage sensitivity parameter controls, for example, the number and the characteristics of the watermarks inserted in the code, or the technique used (lint resistance, etc), and the like. In exemplary embodiments, the administrator device 450 of collaborative software system 400 is configured to provide additional parameters depending on the watermarking algorithm/technology/method that is used. The code repository server 450 is a backend code repository that is configured to store code that does not include the use of watermarks.

Figure 5:
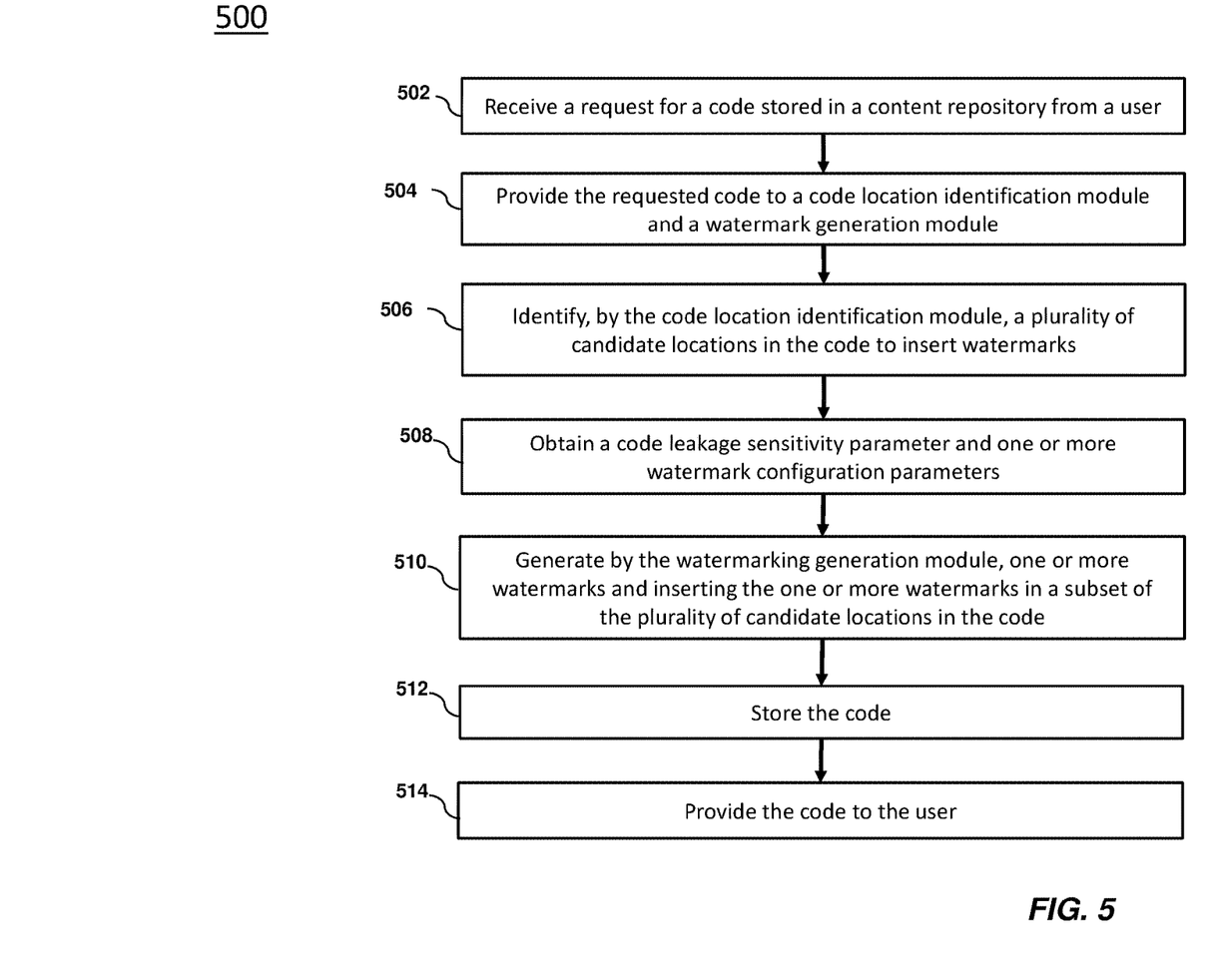
FIG. 5 depicts a flow diagram of a method for performing code checkout from a content repository using dynamic watermarking according to one or more embodiments of the present invention.

Turning now to FIG. 5, a flow diagram of a method 500 for performing code checkout from a content repository using dynamic watermarking in accordance with an embodiment is shown. The method 500 begins at block 502 by receiving a request for a code stored in a content repository from a user. In exemplary embodiments, the code request includes a code checkout, a web browser request, or a specific commit version download. The request includes an identification of the requested code and an identification of the user making the request. Next, the method 500 includes providing the requested code to a code location identification module and a watermark generation module, as shown at block 504.

As shown at block 506, the method 500 includes identifying, by the code location identification module, a plurality of candidate locations in the code to insert watermarks. In exemplary embodiments, the code location identification module analyses the code to identify the plurality of candidate locations using machine learning techniques, such as, for example, a long short-term memory (LSTM) model. LSTM is an artificial recurrent neural network (RNN) architecture that includes has feedback connections. As will be appreciated by those of ordinary skill in the art, other machine learning techniques can also be used to identify the plurality of candidate locations. The plurality of candidate locations are locations where it is statistically unlikely for these watermarks to be removed indivertibly by the user. In one embodiment, the candidate locations are identified by analyzing the general commit history of the repository and/or based on the commit history of the user making the request.

The method 500 also includes obtaining a code leakage sensitivity parameter and one or more watermark configuration parameters, as shown at block 508. Next, as shown at block 510, the method 500 includes generating, by the watermarking generation module, one or more watermarks and inserting the one or more watermarks in a subset of the plurality of candidate locations in the code. In exemplary embodiments, the watermarks are inserted not only in the commit, i.e., the version of the code, being checked out but in a range of commits. In one embodiment, the range of commits that the watermarks are inserted to are configurable by the owner or administrator of the watermarked code repository. In exemplary embodiments, a unique set of possible watermarks are generated for each user. In one embodiment, depending on the configuration of the code repository, as set by the owner or administrator of the repository, the generation of the unique set of possible watermarks is performed each time a new user is added to a code repository, i.e., prior to receiving a request from the user to obtain the code.

The method 500 also includes storing a copy of watermarks inserted for each code requester into a watermark insertion database, as shown at block 512. In exemplary embodiments, a watermark commit tracking module is configured to track the watermarks inserted into the code and to store the code and change history there to the watermark insertion database. The method 500 concludes at block 514 by providing the code to the user.

Figure 6:
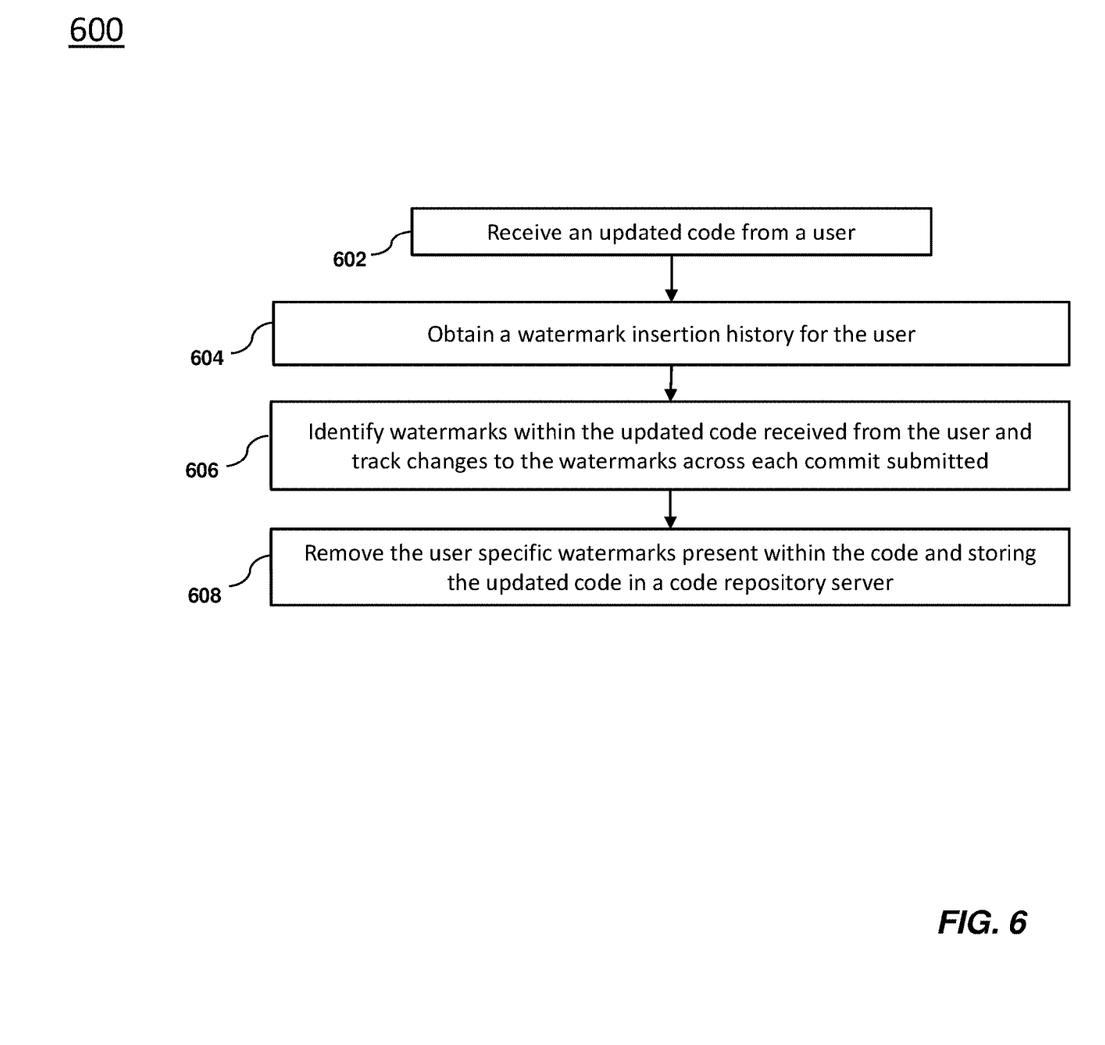
FIG. 6 depicts a flow diagram of a method for updating code stored on a content repository using dynamic watermarking according to one or more embodiments of the present invention.

Turning now to FIG. 6, a flow diagram of a method 600 for updating code stored on a content repository using dynamic watermarking according to one or more embodiments of the present invention is shown. As shown at block 602, the method 600 includes receiving an updated code from a user. In exemplary embodiments, the updated code includes user changes of a local code base through various local code commits. Next, as shown at block 604, the method 600 includes obtaining a watermark insertion history for the user. In exemplary embodiments, a watermark commit tracking module is configured to obtain the watermark insertion history for the user based on the identity of the user. Next, as shown at block 606, the method 600 includes identifying watermarks within the updated code received from the user and tracking changes to the watermarks across each commit submitted. In exemplary embodiments, the updated code and the watermark insertion history for the user are analyzed by a watermarking commit tracking module to identify the original watermarks within the updated code received from the user. The method 600 also includes removing the user-specific watermarks present within the code and storing the updated code in a code repository server, as shown at block 608. In exemplary embodiments, the watermarking generation/removal module is configured to remove the user-specific watermarks present within the code and to submit a cleaned version of the updated code to the code repository.

Figure 7:
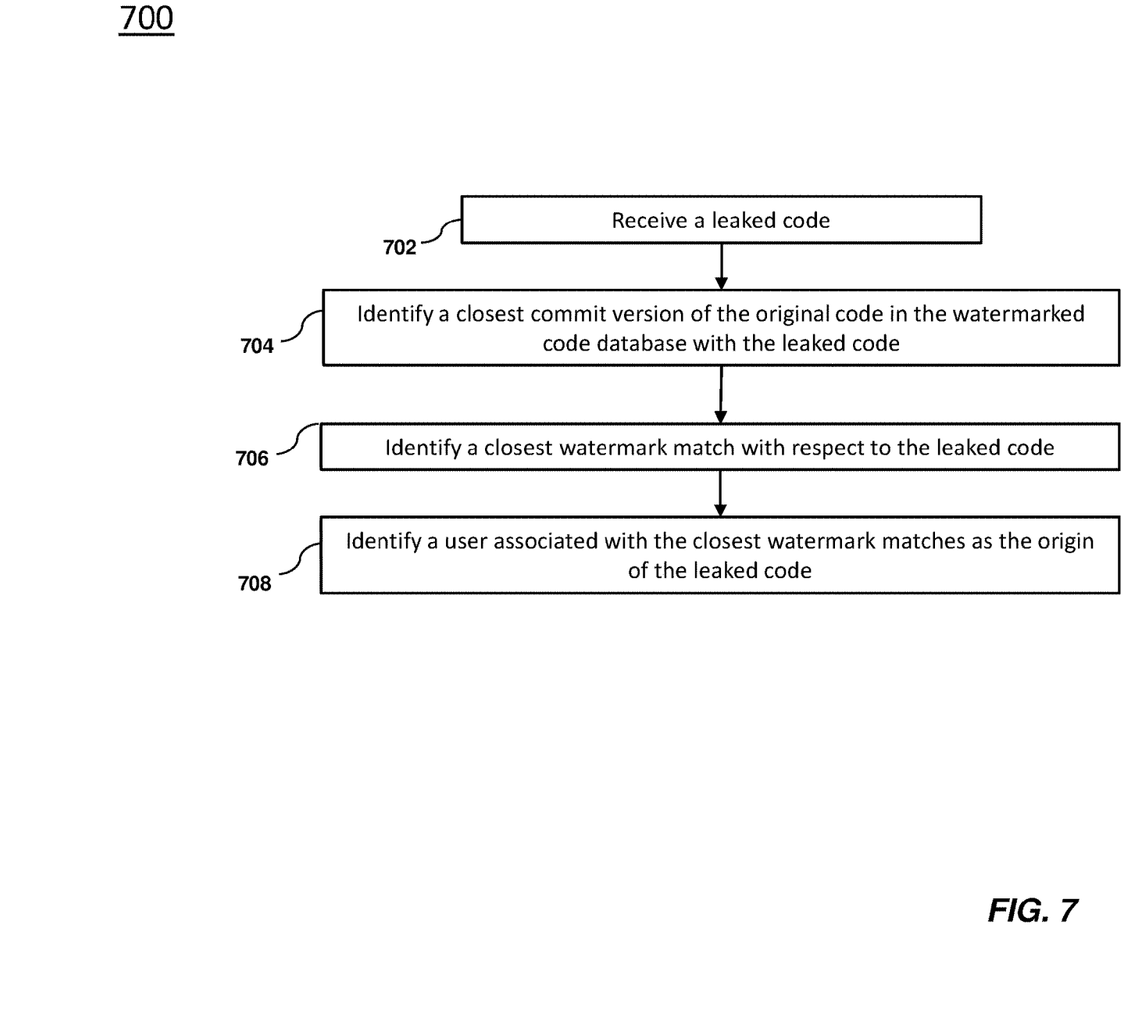
FIG. 7 depicts a flow diagram of a method for detecting an identity of an individual that leaked code from a content repository using dynamic watermarking according to one or more embodiments of the present invention.

Turning now to FIG. 7, a flow diagram of a method 700 for detecting an identity of an individual that leaked code from a content repository using dynamic watermarking according to one or more embodiments of the present invention is shown. As shown at block 702, the method 700 includes receiving a leaked code. Next, as shown at block 704, the method 700 includes identifying, by a closest code identification module, a closest commit version of the original code in the watermarked code database with the leaked code received. In exemplary embodiments, the closest code identification module is configured to identify at which point in the commit history was the code leaked. The method 700 also includes identifying the closest watermark matches with respect to the leaked code. In exemplary embodiments, the closest commit version of the original code and the user-specific watermark insertion histories are provided to the watermark identification module which identifies the closest watermark matches with respect to the leaked code. In one embodiment, this could be performed by using local sensitive hashing. As shown at block 708, the method 700 concludes by identifying a user associated with the closest watermark matches as the origin of the leaked code.

In one example, two or more malicious users are accomplices in leaking code. These malicious users compare the versions of the code that they each received with each other and identify which part was changed, i.e., to identify the watermarks inserted. In exemplary embodiments, the watermark generation module is configured to select which watermarks to introduce in each code release in such a way that each user group possesses a subset of identical watermarks. By providing a subset of identical watermarks across each user group, the malicious comparison of code can not be used to identify, and remove, all of the inserted watermarks. As a result, whenever malicious accomplices decide to revert watermarks that differ in their versions, the common subset of watermarks they possess can reveal that both parties were involved in potential watermark tampering activities.

In exemplary embodiments, the insertion of user-specific watermarks as disclosed herein is designed to make the process of leaking code significantly tedious and risky and to act as a deterrent to malicious behavior. Various embodiments of a watermark code repository can be instantiated with various degrees of security by the code repository administrators or owners by adjusting a code leakage sensitivity parameter that is input into the watermark code repository. In one example, login functionalities for the watermark code repository could be enforced, so that anonymous web browsers or downloaders of the codebases are forbidden. In another embodiment, if the repository owners are satisfied with only acquiring IP addresses of potential leakers this requirement can be removed. In one embodiment, a number of files present within the repository and the size of the files, i.e., the number of lines of code in each file, also will affect the overall security of the deterrent, since the fewer files there is in the repository, the fewer locations available there will be to insert watermarks.

In exemplary embodiments, watermarks are only applied to only a subset of a code commit history as opposed to the entire codebase. For instance, code written before a specified date, or outside of a specified time period, is considered boilerplate code with little risk of code leakage, however, code written since a specified date, or within the specified time period, is considered highly sensitive and hence watermarked. Similarly, watermarks can also be applied to only specific areas/classes/modules of the code. For instance, code that does not contain any particular intellectual property can be ignored, while specific areas of the code that contain confidential intellectual property should be watermarked.

Technical benefits include an improved functionality of a collaborative software system that includes a watermarked code repository server. In one embodiment, the watermarked code repository server is configured to insert user-specific watermarks into code provided to a user in a manner such that the identity of a user that leaks code can be determined by the watermarked code repository server give the leaked code. In exemplary embodiments, a watermarked code repository server can be implemented as a feature of an existing content repository (such as for example a GitHub repository) or implemented as a stand-alone system that acts as a proxy to an existing repository, with no modification needed to the existing repository.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic watermarking code in a collaborative software system, the method comprising:
   receiving, by a processor, a request for a code stored in a content repository from a user;
   identifying, by the processor, a plurality of candidate locations in the code to insert watermarks;
   generating, by the processor, one or more watermarks;
   inserting, by the processor, the one or more watermarks in a subset of the plurality of candidate locations in the code;
   providing, by the processor, the code, including the one or more watermarks, to the user;
   receiving an updated code from the user;
   obtaining a watermark insertion history for the user;
   identifying one or more user-specific watermarks within the updated code received from the user based on the watermark insertion history for the user;
   tracking changes to the one or more user-specific watermarks across each commit in the updated code;
   removing the one or more user-specific watermarks present within the updated code; and
   storing the updated code in a code repository server.

2. The method of claim 1, wherein the one or more watermarks are generated at least in part based on an identity of the user.

3. The method of claim 2, wherein the one or more watermarks are generated at least in part based on one or more watermark configuration parameters.

4. The method of claim 2, wherein the identity of the user is based on at least one of a username of the user and an internet protocol (IP) address of a user device used by the user to request the code.

5. The method of claim 1, wherein the plurality of candidate locations are identified based at least in part on a code leakage sensitivity parameter.

6. The method of claim 1, further comprising storing the code provided to the user in a watermarked code database.

7. The method of claim 1, wherein the one or more watermarks inserted into the code are unique to the user that requested the code.

8. A collaborative software system, comprising:
   a memory having computer readable instructions; and
   a processor for executing the computer readable instructions, the computer readable instructions including instructions for:
   receiving a request for a code stored in a content repository from a user;
   identifying a plurality of candidate locations in the code to insert watermarks;
   generating one or more watermarks;
   inserting the one or more watermarks in a subset of the plurality of candidate locations in the code;
   providing the code, including the one or more watermarks, to the user;
   receiving an updated code from the user;
   obtaining a watermark insertion history for the user;
   identifying one or more user-specific watermarks within the updated code received from the user based on the watermark insertion history for the user;
   tracking changes to the one or more user-specific watermarks across each commit in the updated code;
   removing the one or more user-specific watermarks present within the updated code; and
   storing the updated code in a code repository server.

9. The system of claim 8, wherein the one or more watermarks are generated at least in part based on an identity of the user.

10. The system of claim 9, wherein the one or more watermarks are generated at least in part based on one or more watermark configuration parameters.

11. The system of claim 9, wherein the identity of the user is based on at least one of a username of the user and an internet protocol (IP) address of a user device used by the user to request the code.

12. The system of claim 8, wherein the plurality of candidate locations are identified based at least in part on a code leakage sensitivity parameter.

13. The system of claim 8, wherein the computer readable instructions further include instructions for storing the code provided to the user in a watermarked code database.

14. The system of claim 8, wherein the one or more watermarks inserted into the code are unique to the user that requested the code.

15. A computer program product comprising a non-transitory computer readable storage medium having program instructions embodied therewith the program instructions executable by a computer processor to cause the computer processor to perform a method, comprising:
   receiving a request for a code stored in a content repository from a user;
   identifying a plurality of candidate locations in the code to insert watermarks;
   generating one or more watermarks;
   inserting the one or more watermarks in a subset of the plurality of candidate locations in the code;
   providing the code, including the one or more watermarks, to the user;
   receiving an updated code from the user;
   obtaining a watermark insertion history for the user;
   identifying one or more user-specific watermarks within the updated code received from the user based on the watermark insertion history for the user;
   tracking changes to the one or more user-specific watermarks across each commit in the updated code;
   removing the one or more user-specific watermarks present within the updated code; and
   storing the updated code in a code repository server.

16. The computer program product of claim 15, wherein the one or more watermarks are generated at least in part based on an identity of the user.

17. The computer program product of claim 16, wherein the one or more watermarks are generated at least in part based on one or more watermark configuration parameters.

18. The computer program product of claim 16, wherein the identity of the user is based on at least one of a username of the user and an internet protocol (IP) address of a user device used by the user to request the code.

* * * * *